(12) United States Patent
Eckloff

(10) Patent No.: US 7,338,110 B1
(45) Date of Patent: Mar. 4, 2008

(54) RACK AND SHELF SYSTEM FOR CARGO VEHICLES

(76) Inventor: Donald Eckloff, 8 Chippewa Way, Cranford, NJ (US) 07016

( * ) Notice: Subject to any disclaimer, the term of this patent is extended or adjusted under 35 U.S.C. 154(b) by 255 days.

(21) Appl. No.: 11/083,194

(22) Filed: Mar. 17, 2005

Related U.S. Application Data

(60) Provisional application No. 60/554,343, filed on Mar. 18, 2004.

(51) Int. Cl.
B62D 33/00 (2006.01)

(52) U.S. Cl. .......................... 296/182.1; 296/3

(58) Field of Classification Search .............. 296/3, 296/10, 13, 14, 24.44, 182.1; 224/42.32, 224/42.33, 288, 401, 403; 211/90.01, 96, 211/99, 119.003
See application file for complete search history.

(56) References Cited

U.S. PATENT DOCUMENTS

| 1,611,078 A | * | 12/1926 | Robson .................... 296/186.1 |
| 2,574,483 A | | 11/1951 | Jack |
| 3,672,529 A | * | 6/1972 | Feddersen et al. ........... 220/1.5 |
| 3,911,832 A | | 10/1975 | Vandergriff |
| 5,192,176 A | | 3/1993 | Roberts |
| 5,452,972 A | | 9/1995 | Adams |
| 5,634,681 A | * | 6/1997 | Gionta ........................... 296/3 |
| 5,807,047 A | | 9/1998 | Cox |
| 5,868,263 A | | 2/1999 | McAllister et al. |
| 5,934,849 A | | 8/1999 | Haire |
| 6,193,083 B1 | * | 2/2001 | Wood ...................... 211/87.01 |
| 6,347,731 B1 | * | 2/2002 | Burger ....................... 224/405 |
| 6,487,979 B2 | | 12/2002 | Ash et al. |
| 6,675,980 B2 | | 1/2004 | Ehrgott |
| 2003/0151231 A1 | * | 8/2003 | Calleja ....................... 280/638 |

OTHER PUBLICATIONS

Undated sales brochure from Placer Limited entitled "Shelving For Your FedEx Truck".
Photograph from 2004 UPS calendar.
System Edstrom of Sweden Inc.—A Place For Everything (catalogue)—date unknown—52 pages.

* cited by examiner

Primary Examiner—Lori L. Lyjak
(74) Attorney, Agent, or Firm—Pryor Cashman LLP; Barry E. Negrin

(57) ABSTRACT

A shelving system for a cargo vehicle is provided. Free-standing substantially vertical upright support members not attached to the walls of the cargo area of a vehicle are secured at their bottom ends to the floor of the cargo area of a vehicle and are horizontally spaced apart. The top ends of the upright support members may be secured to ribs in the roof of the vehicle or to separate transverse support members parallel to the roof. Shelves are vertically adjustably attached to the upright members. The upright and/or transverse support members may be provided with telescoping portions so as to be adjustable in height/length.

22 Claims, 21 Drawing Sheets

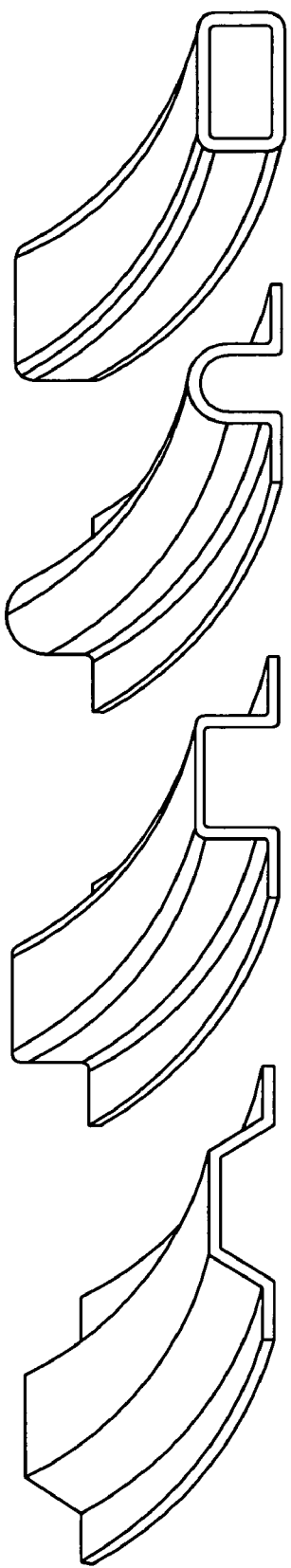

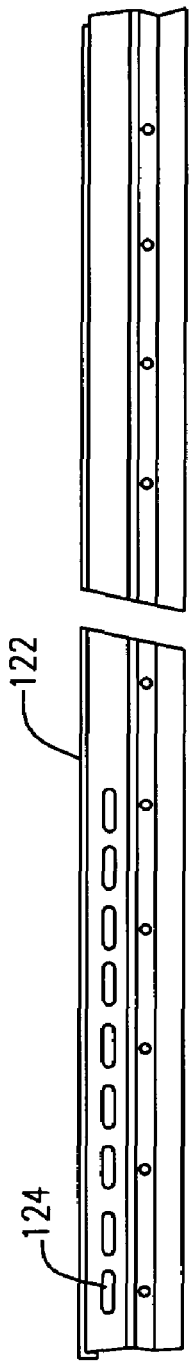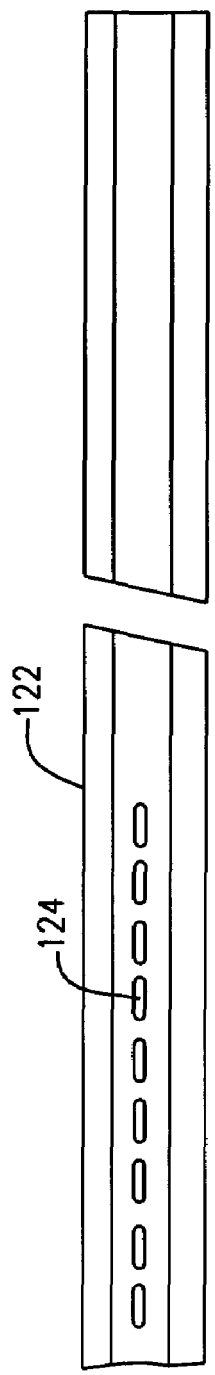
FIG. 20A
FIG. 20C
FIG. 20D
FIG. 20B

RACK AND SHELF SYSTEM FOR CARGO VEHICLES

RELATED APPLICATIONS

Domestic priority is claimed from U.S. Provisional Patent Application No. 60/554,343 filed Mar. 18, 2004, the teachings of which are incorporated by reference herein.

BACKGROUND

1. Field of the Invention

The present invention relates to racking systems for cargo vehicles, such as box type trucks, and more particularly, to such systems that include internal shelves and shelf supporting structures.

2. Description of Related Art

Although a large variety of box truck designs exist, they all include the common features of large interior space defined by the sidewalls, front and back walls, top wall, and floor. The steel truck mainframe supports the flooring, which can include a wooden or metal platform secured to the main frame. The floor is normally bowed from front to rear in order to compensate for and provide some flexibility for heavy loads carried within the cargo area. The sidewalls and ceiling or roof usually comprise material with little load bearing capability, such as fiberglass, plywood, thin sheet metal, etc. The primary cargo load bearing structure for trucks of this type include the flooring and main frame. For many designs, metal steel or aluminum bars mounted at the box corners and along the edges of the box for the purpose of transferring and carrying forces outward and downward to the main frame. Also, the side walls may be corrugated with vertically extending channels to purportedly strengthen the sidewalls, or a portion of the sidewall may be fitted with a series of longitudinally spaced vertically extending channel members riveted to the inside or outside of the side walls.

It is known that these box trucks have great utility, particularly for delivery companies that pick up, haul, and deliver a great number or variety of packages potentially of varying size, shape, and weight. There is a present need in this industry for box trucks that include racking or shelving systems that provide two or three levels of shelves within the cargo area, in which the shelves can be easily and reliably rotated between a near vertical stored position and a horizontal utility position.

One known attempt at such a system included an elongated piano hinge assembly having one stationary horizontal bar part bolted or riveted to the inside surface of the sidewalls. In this conventional system, metal shelving connects to the other or rotating part of the hinge assembly. The shelving rotates downward to a storage position and rotates to a horizontal position for use.

Technical difficulties with this system included damage to the sidewalls resulting primarily from the static and dynamic shelf and cargo weight as well as the vibrations imparted to the connection points where the hinge member is riveted to the sidewalls. Another disadvantage relates to the permanent fixed position of the piano hinge, which prevents vertical adjustment of the shelving after initial installation. That is, while a shelf may be moved into either a downward storage position or a flat in-use position, the spacing between shelves is not adjustable after installation.

SUMMARY OF THE INVENTION

The object of the present invention is to provide a rack system of the type described that includes a substantially free standing frame so that the frame weight and cargo weight as well as dynamic forces are substantially directly transferred to the floor and mainframe of the truck instead of using the walls of the cargo area to bear significant loads.

A further object of the present invention includes providing such a rack system for box trucks and the like in which separate shelves can be selectively rotated between stored and utility positions.

Yet a further object of the present invention includes providing a rack system with rotatable shelving that can carry more cargo weight then conventional systems of this type.

Yet a further object of the present invention includes providing such a rack system frame with a series of vertical upright members that rotatably support the shelving sections and that can support or connect to transverse struts mounted to or under the cargo area ceiling. In addition, the upstanding upright member supports for the shelving can be easily assembled outside of the cargo area and installed within the box truck as a unit. Once installed, the shelving can be easily attached to the vertical upright members as more fully described below. This procedure reduces the amount of time and labor needed to complete the installation.

The invention is a shelving system for a cargo vehicle including free-standing substantially vertical upright support members, each having a top end and a bottom end. The bottom ends are secured to the floor of a cargo area of a vehicle, and the upright support members being horizontally spaced apart. Shelves are vertically adjustably attached to the upright members. The upright support members are flush against at least one of the walls of the cargo area of the vehicle but not secured to any of the walls. That is, the upright support members are aligned with the side walls of the cargo area.

Preferably, the inventive shelving system includes a first crossbar substantially parallel to a wall of the cargo area securing the top ends of the upright support members of a common wall together. Transverse support members substantially perpendicular to the side walls of the cargo area preferably secure the top ends of opposing of the upright support members of opposite walls. Alternatively, the top ends of the upright support members may be secured to transverse ribs of the roof of the cargo vehicle. Preferably, a second crossbar secures the bottom ends of the upright support members of a common wall together.

The upright support members and the transverse support members (if used) are preferably adjustable in height/length. In the case of the upright support members, the bottom ends preferably include telescoping feet adjustable to accommodate variations in the height of the floor of the cargo vehicle. Alternatively, shims may be inserted between the bottom ends and the floor of the cargo vehicle to accommodate variations in the height of the floor. In the case of the transverse support members, each of the transverse support members includes a first transverse element and a second transverse element. At least a portion of the second transverse element is of smaller diameter than at least a portion of the first transverse element; the portion of the second transverse element is telescopable within and fixable to the larger portion of the first transverse element to thereby adjust the length of the transverse support member.

Preferably, the shelves of the invention are pivotable between a first in-use position substantially parallel to the floor of the cargo vehicle and a second storage position substantially parallel to the walls of the cargo vehicle. Each of the upright support members preferably has a central longitudinal channel, and the shelves are attached to channel brackets pivotably securable to the channels of the upright support members. More preferably, first holes are formed in the channels, and second holes formed in the channel brackets. A bushing is disposed in the first and second holes securing the channel brackets to the channels, and the channel brackets rotate about the bushings. Multiple sets of holes are preferably vertically disposed along the channel, so that shelf height can be vertically adjusted by selecting which of the sets of holes in the channel to secure the bushing and the channel bracket. Each shelf is preferably independently adjustable.

It is also preferred that the inventive shelving system be assembleable in modular frame sections outside the cargo area of a cargo vehicle. Any or all of the upright support members, the first and second crossbars, and/or the transverse support members may be pre-assembled outside the vehicle and then installed as a unit inside the cargo area of the vehicle.

One exemplary embodiment according to the principles of the present invention includes a racking system with a series of metal upstanding upright members formed into by one or more frame sections. Each section mounts to and is supported directly by the cargo area floor and each section is mounted flush with a respective cargo area wall. Lateral/transverse roof struts or ribs extend across the cargo area and couple directly or indirectly to the top portions of the uprights, thereby transferring horizontal load. Thus, accordingly to the present invention, the framing system is free standing within the cargo area in the sense that none of the side walls need carry a significant dynamic or static load.

According to another feature of the present invention, the uprights include a pair of opposed wings that mount flush against a side wall of the box interior with a channel or rib portion extending away from the respective wall. The bottoms of the upright members cooperate with the floor of the cargo box to transfer load forces through the floor to the mainframe of the vehicle. It is preferred that the feet of the upright members be made in a telescoping manner to accommodate for the designed arc or bow of the cargo box floor. Alternatively, shims be installed under the upright member bottoms.

According to another feature according to the inventive principles, a number of shelf brackets are provided to connect to and support the shelving. The bracket outboard end forms a pair of opposed ears that fit on either side of the upright channel. The upper part of the ears pivot about the axis of a longitudinal bolt held in the upright. In the down or utility position, the bracket abuts the channel or rib inboard face. The bracket can rotate upward about the through bolt or, in cases where the shelf is frequently moved between its in-use and storage positions, a bushing, to the stored position where it can be held safely by a suitable device in the stored position. (For cases where the shelf would not be moved frequently, a simple through bolt or similar axle-like structure will suffice.) One shelf section preferably spans and connects to at least two brackets. A series of vertically spaced upright holes and through bolts can be provided to enable vertical adjustment and mounting of the various shelf sections simply by removing and repositioning the through bolt to a different upright though hole.

BRIEF DESCRIPTION OF THE DRAWINGS

Other and further advantages and benefits afforded by the present invention will become apparent with the following detailed description when taken with the drawings in which:

FIGS. 15 A-D are partial perspective views of various suitable rib 76 configurations.

FIGS. 20A-D are a perspective and various elevation views of the lower region of the adjustable vertical upright member.

DETAILED DESCRIPTION OF EXEMPLARY EMBODIMENTS OF THE INVENTION

Description of the invention will now be given with reference to the attached FIGS. 1-21. It should be noted that these figures and the embodiments depicted in them are exemplary in nature and in no way serve to limit the scope of the invention, which is defined by the claims appearing hereinbelow.

Figure 1:
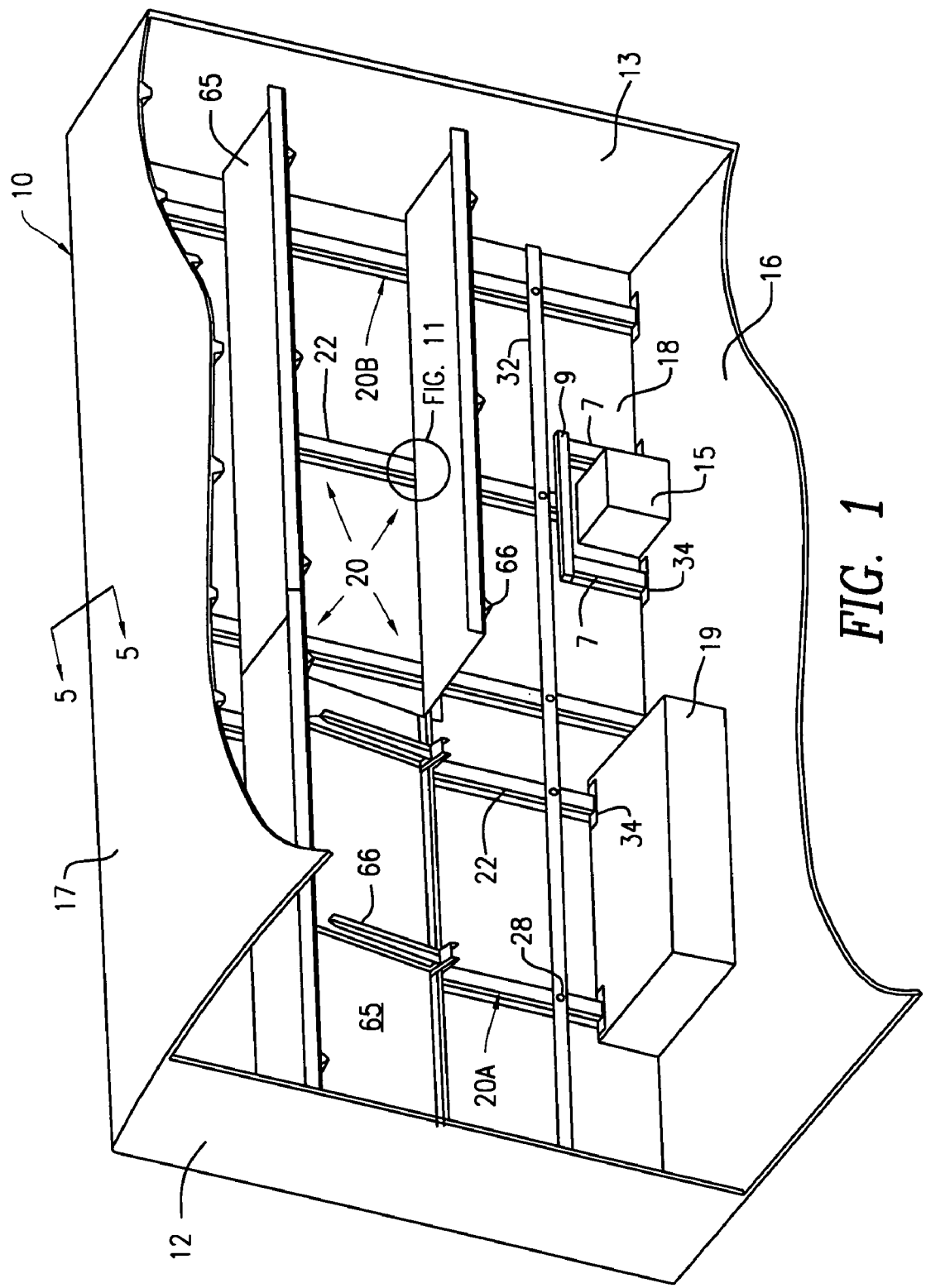
FIG. 1 is a cut-a-way perspective view of a portion of an exemplary embodiment of a box truck according to the principles of the present invention.
Figure 2:
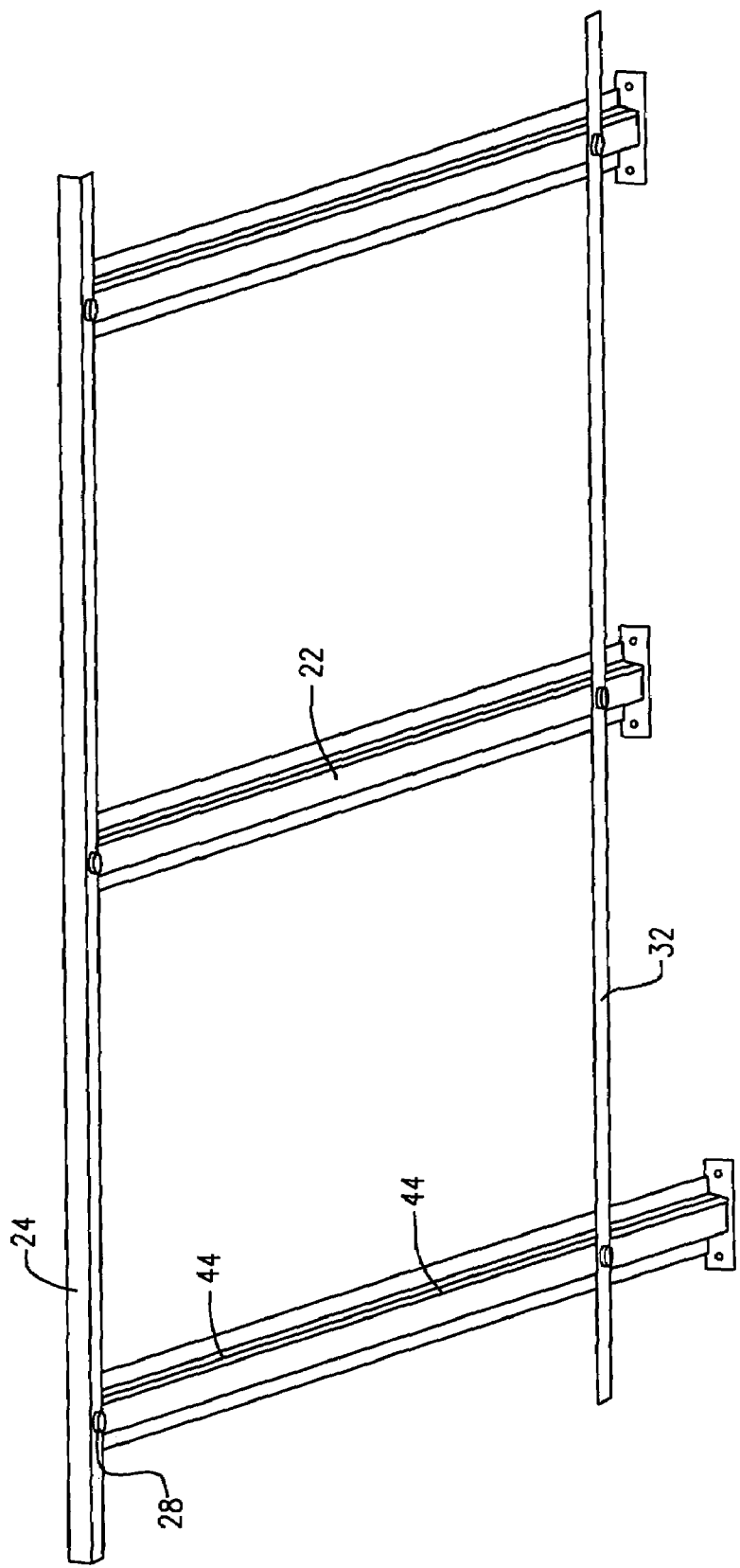
FIG. 2 is a perspective view taken from the inboard side of an upright frame section of FIG. 1.
Figure 4:
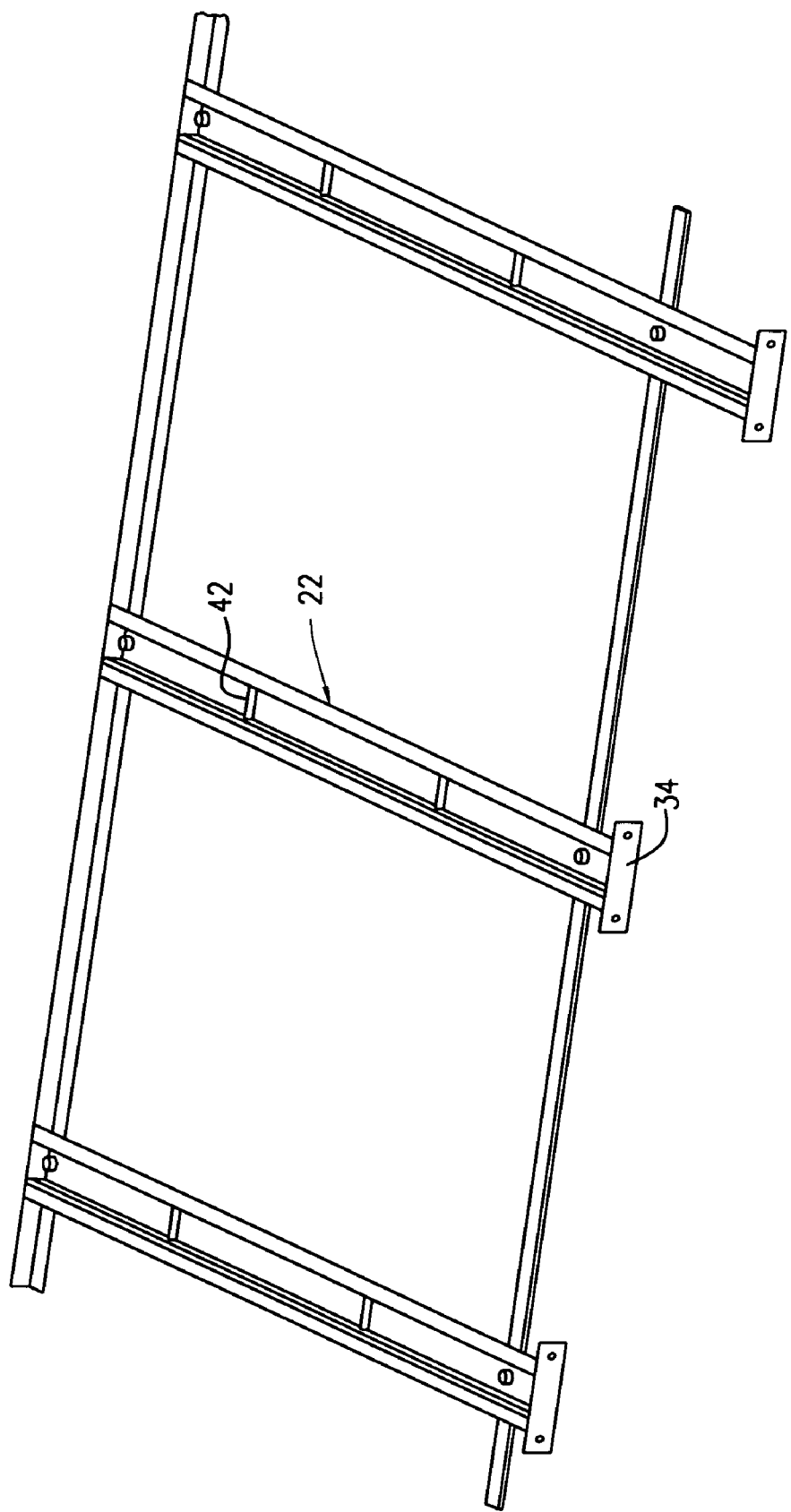
FIG. 4 is similar to FIG. 2 taken from the outboard side of FIG. 2.
Figure 5:
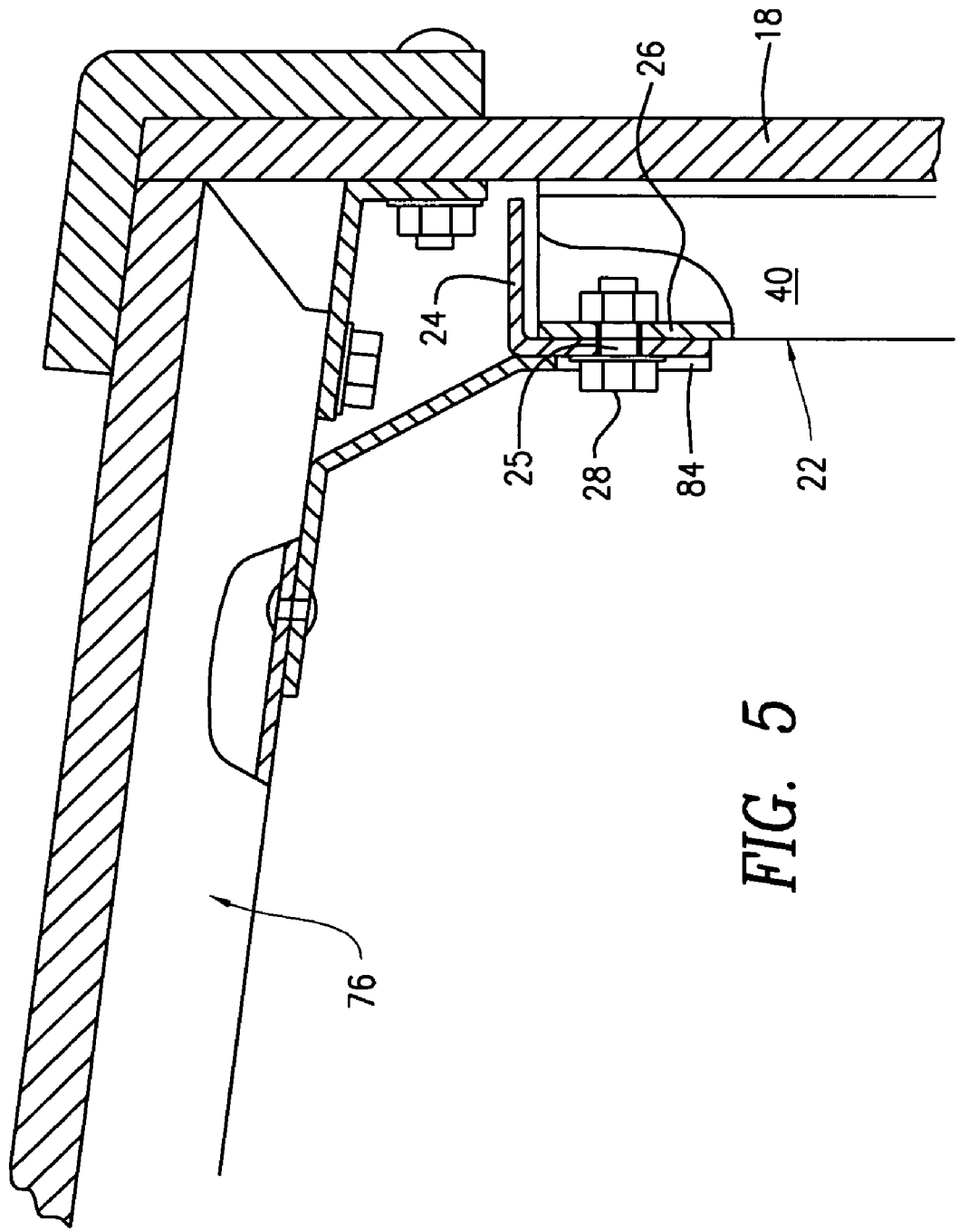
FIG. 5 is a front sectional cut-a-way view of the upper, outer portion of the truck taken along line FIG. 5-FIG. 5 of FIG. 1.
Figure 6:
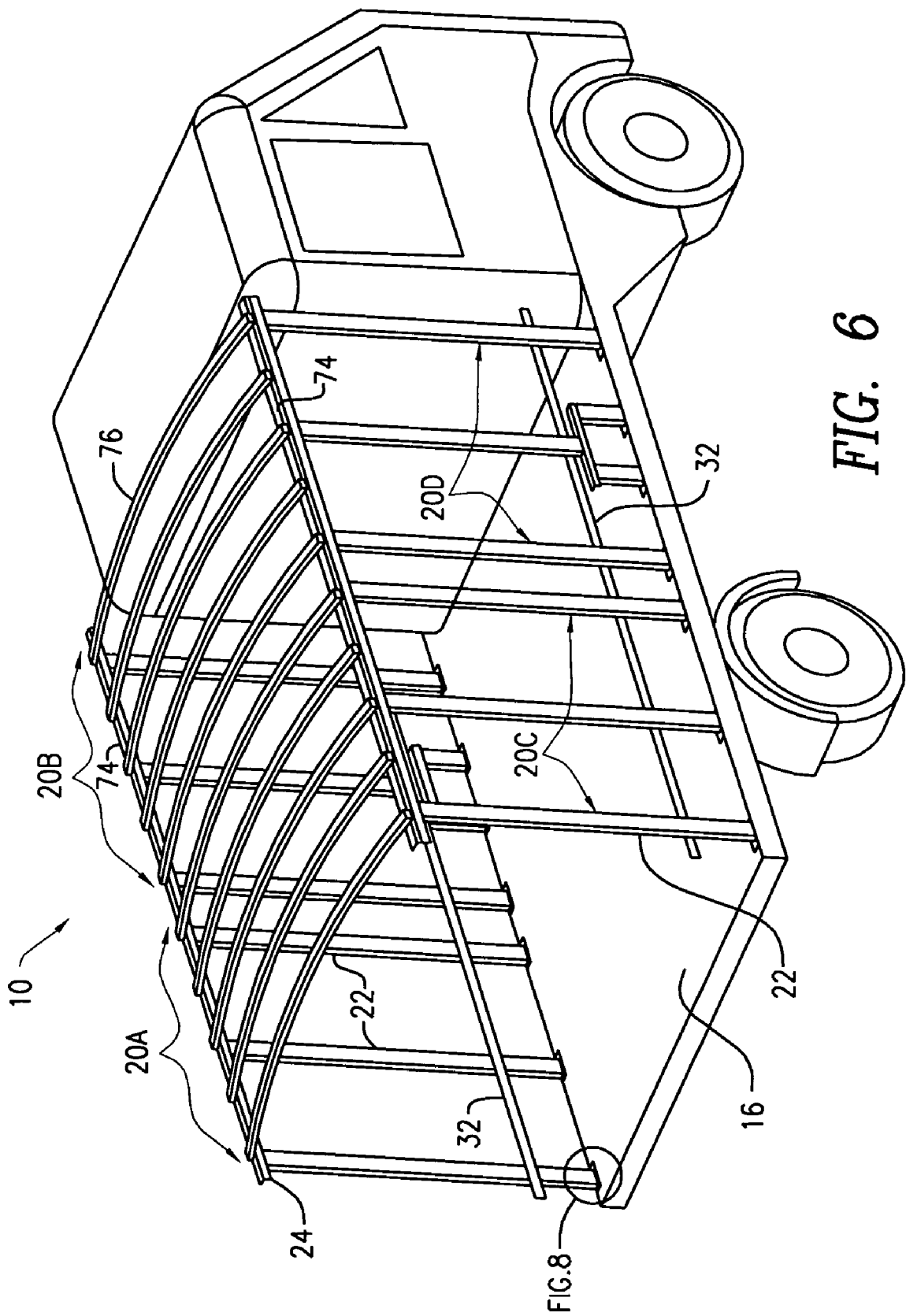
FIG. 6 is a pictorial perspective view of the vehicle with free standing racking frame system without the walls/roof of the cargo area nor the shelves shown.
Figure 16A:
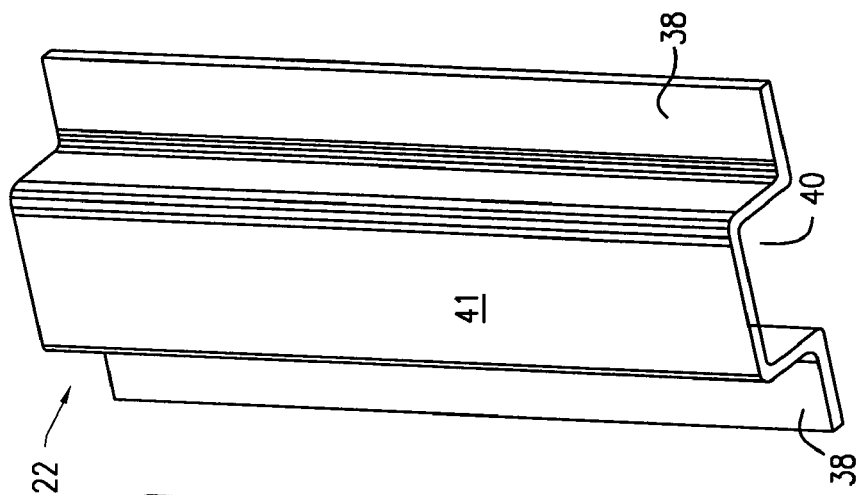
FIGS. 16 A-D is similar to FIG. 15 showing various suitable upright member configurations.
Figure 16B:
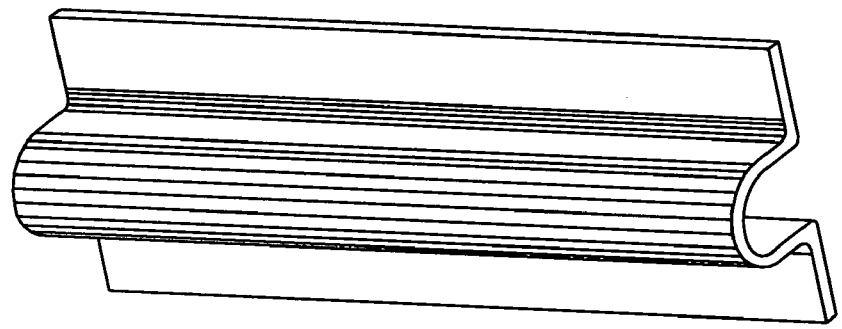
Figure 16C:
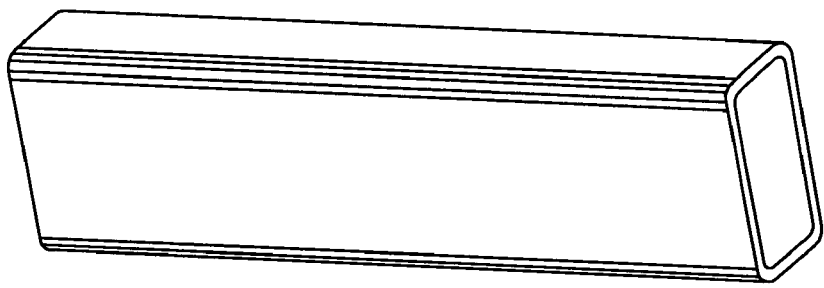
Figure 16D:
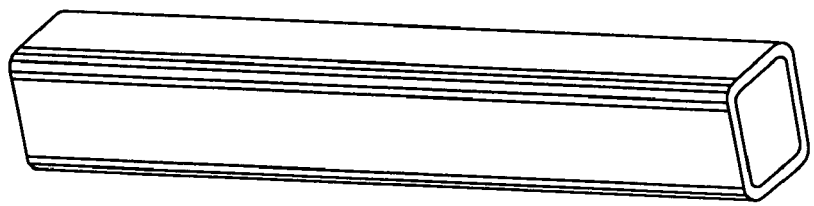

An exemplary embodiment according to the principles of the present invention is shown in FIGS. 1-21 for a typical box truck 10 having rear wall 12, front wall 13, floor 16, and roof 17. Also standard are fueling port cover 15 and wheel well 19. A side door on the opposite wall and rear doors on back wall 12 are not shown for clarity. Racking system 20 includes a frame sections 20 A, B, C, and D (see FIG. 6) formed by a series of longitudinally spaced upright support members 22. These upright members serve to support the shelving and transfer static and dynamic loads directly to the floor and mainframe of the vehicle, as further described below. The uprights are made of suitable load bearing metal and can be any one of suitable forms such as channel members 22, as shown in FIGS. 2, 4, and 16A, e.g. Alternate designs are shown in FIGS. 16B-D. Crossbars 24 and 32 (see, e.g., FIGS. 2 and 6) are secured by bolts 28 near the tops and bottoms of members 22 to hold the predetermined longitudinal spacing there between, assure the vertical or upward alignment of members 22, and provide for longitudinal stability until the frame sections are installed in the cargo area. In the preferred embodiment, upper crossbar 24 is an angle bar as shown in FIG. 5, while lower crossbar may be flat. As shown in FIG. 16A, upright support member 22 can be formed as an elongated channel 40 having side flanges 38 and a center span 41. To facilitate easy and quick installation, channels 40 have openings 25 (see FIG. 5) near their tops and bottoms; various other parts of the inventive frame (to be discussed below) may be secured to upright members 22 at openings 25 via bolts 28 and nuts 26, e.g. Bolts 28 may also be self-locking or used with lock washers, rather than threaded into nuts 26 for reliable securement.

Figure 3:
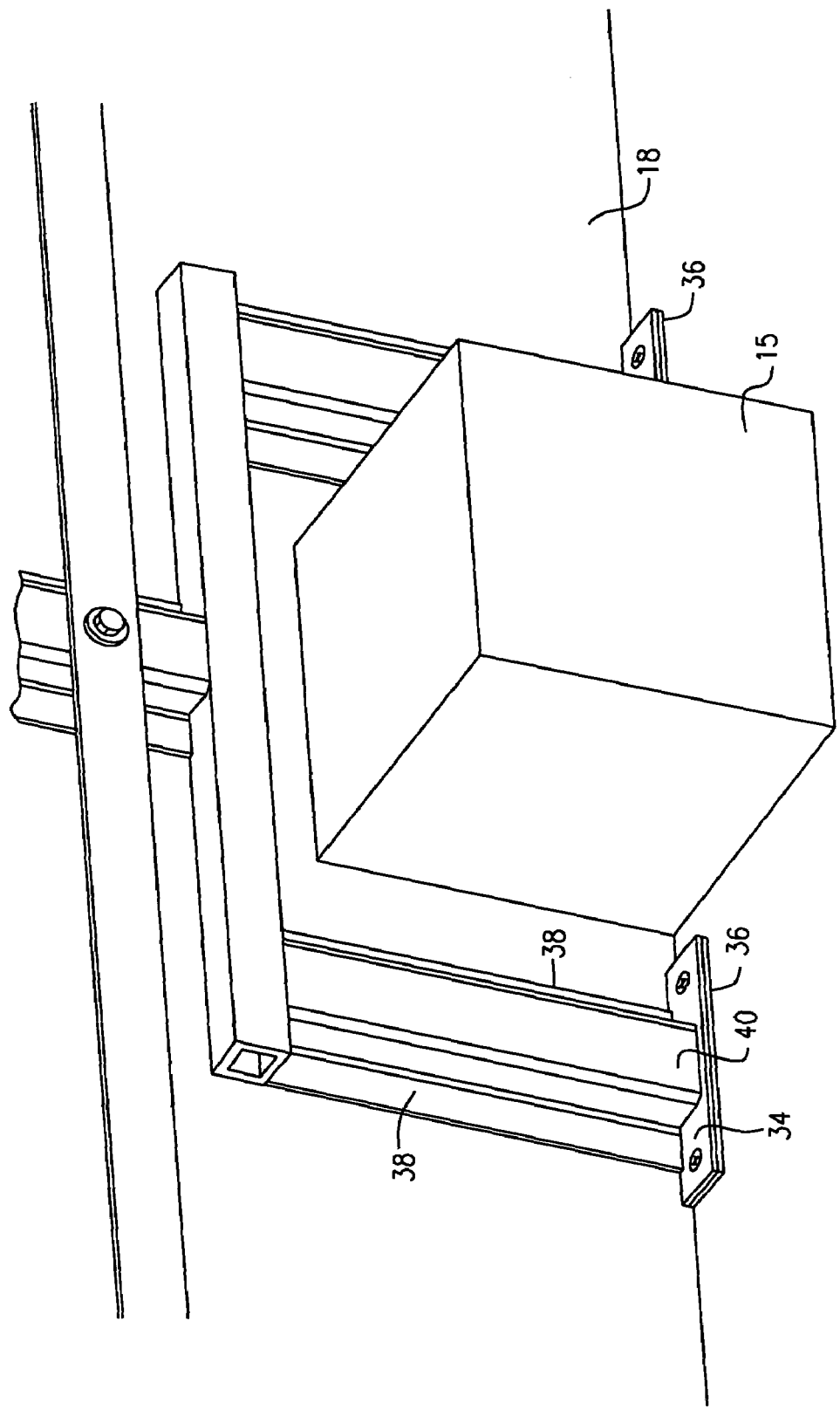
FIG. 3 is an enlarged perspective of a portion of FIG. 1.

Members 22 also include foot or floor plates 34 welded or otherwise secured to the bottoms thereof (see FIG. 3). These plates 34 are screwed or bolted into the floor 16 or other supporting surface such as well 19 (see FIG. 1). The vertical lengths of upright channel members 22 may be unequal and should be selected to follow the bowed or arcuate design of the cargo floor (the arc is not shown in the drawings).

Figure 19:
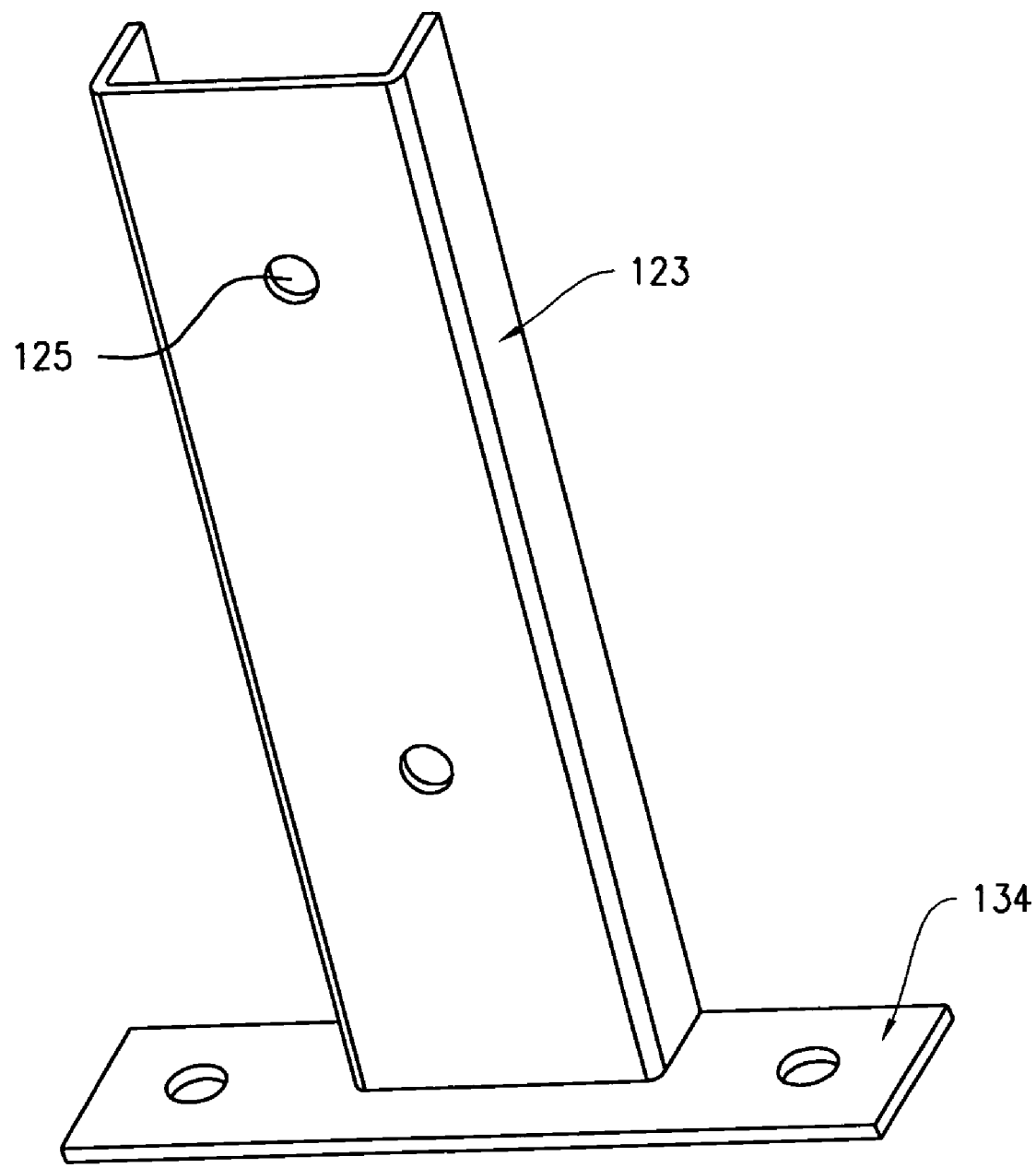
FIG. 19 is a perspective view of a bracket for an adjustable upright member.

The upright support members 22 are preferably adjustable in height. The bottom ends preferably include telescoping feet adjustable to accommodate variations in the height of the floor of the cargo vehicle. As best shown in FIGS. 19 and 20, bracket 123 includes holes 125 and a foot 134 which correspond to the lower region 122 of upright member 22. Bracket 123 is adapted to fit around the center span of the lower region 122 of upright support member 22. Lower region 122 includes slots 124 and holes 126 to which bracket 123 can be secured (via holes 125). Foot 134 is selectively positioned relative to lower region 122A, and bracket 123 is bolted or otherwise secured to lower region 122 so that upright support member 22 is of the proper height and transfers load to the floor of the cargo bay. In this way, the height of the upright support members 22 may be adjustable.

Figure 8:
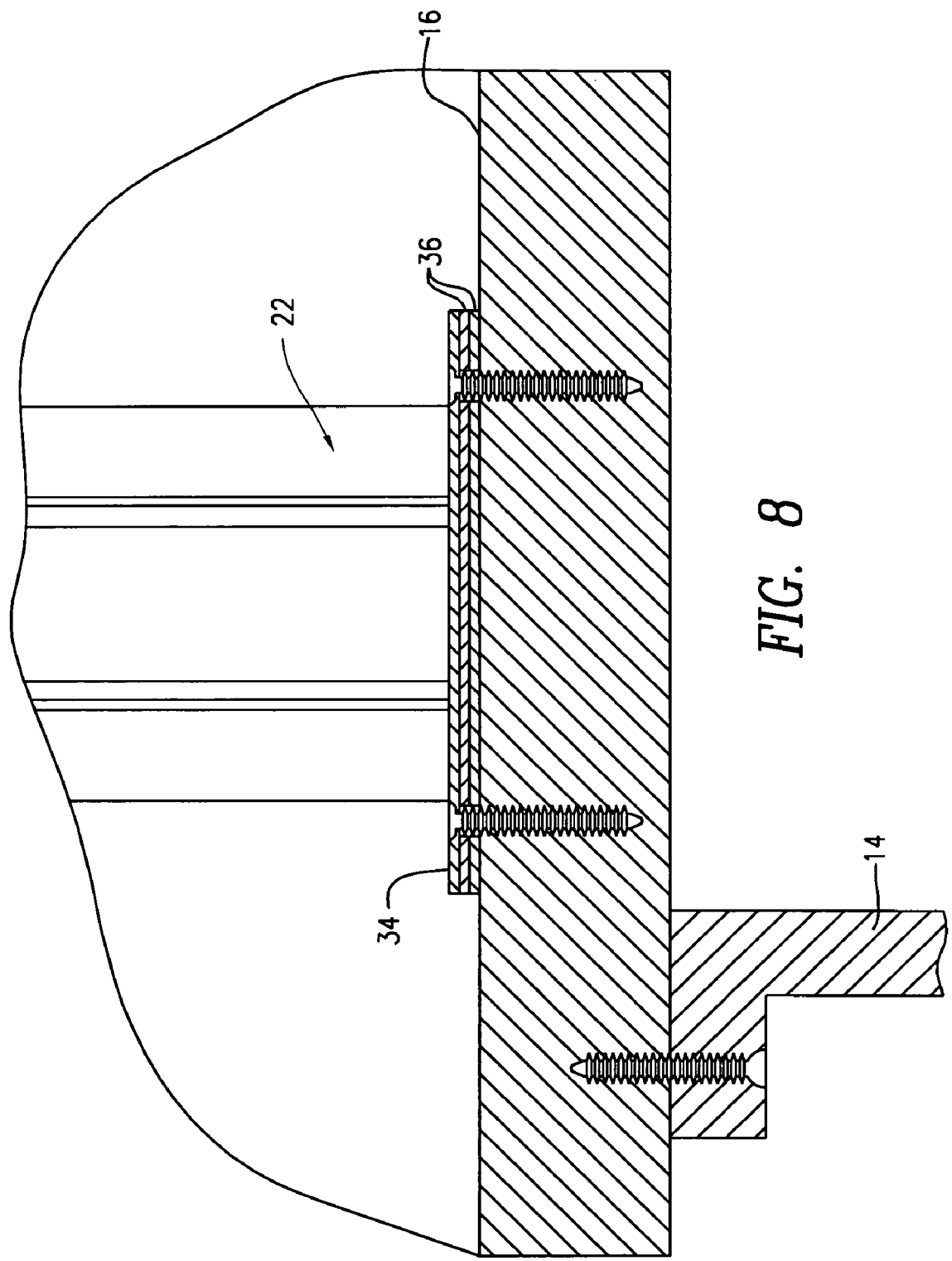
FIG. 8 is a side sectional detail view taken from the inboard side of the detail of FIG. 1.

Instead of the preferred adjustable foot just described, shims 36 could be used to assure that, after installation, the tops of the members 22 are at the proper height with respect to the vehicle upper corner roof bar and the bottoms and shims transfer loads directly to the floor and thus the main frame below. As seen in FIG. 8, plates 34 and shims 36 are screwed or bolted to floor 16. This assures that the frame sections 20A, B, C, and D will be free standing but solidly secured to and transfer loads directly to the floor and mainframe of the vehicle.

The longitudinal spacing and number of members 22 in each rack 20 A-D section can be selected to match the overall length of the vehicle or application of the racking system. In this example, two frame sections, aft sections 20A and C and forward sections 20B and D, are provided. It is preferred but not essential that respective facing frame sections have the same number and lateral respective opposing position for respective uprights. Each frame section 20A, B, C, and D can be assembled either inside housing 10, but preferably they can be assembled outside the cargo area and brought into the cargo area for installation. If desired, temporary indexing bars (not shown) can be mounted to the uprights to hold alignment until the shims and floor plates 34 are mounted to the floor.

Although it is preferable to mount the framing sections and shims directly to the floor of the cargo area, it may not be possible or practical to do so for all uprights. For example, the frame channels 22 may need to be shortened and shimmed to mount directly on to the wheel well 19 as seen in FIG. 1. Also, a member 22 may be forked, as shown in detail in FIG. 3, to straddle objects such as cover 15. In this case, a box girder 9 can be welded to the bottom of member 22 and leg-type upright members 7 can be welded to girder 9 at either side of cover 15.

Figure 7:
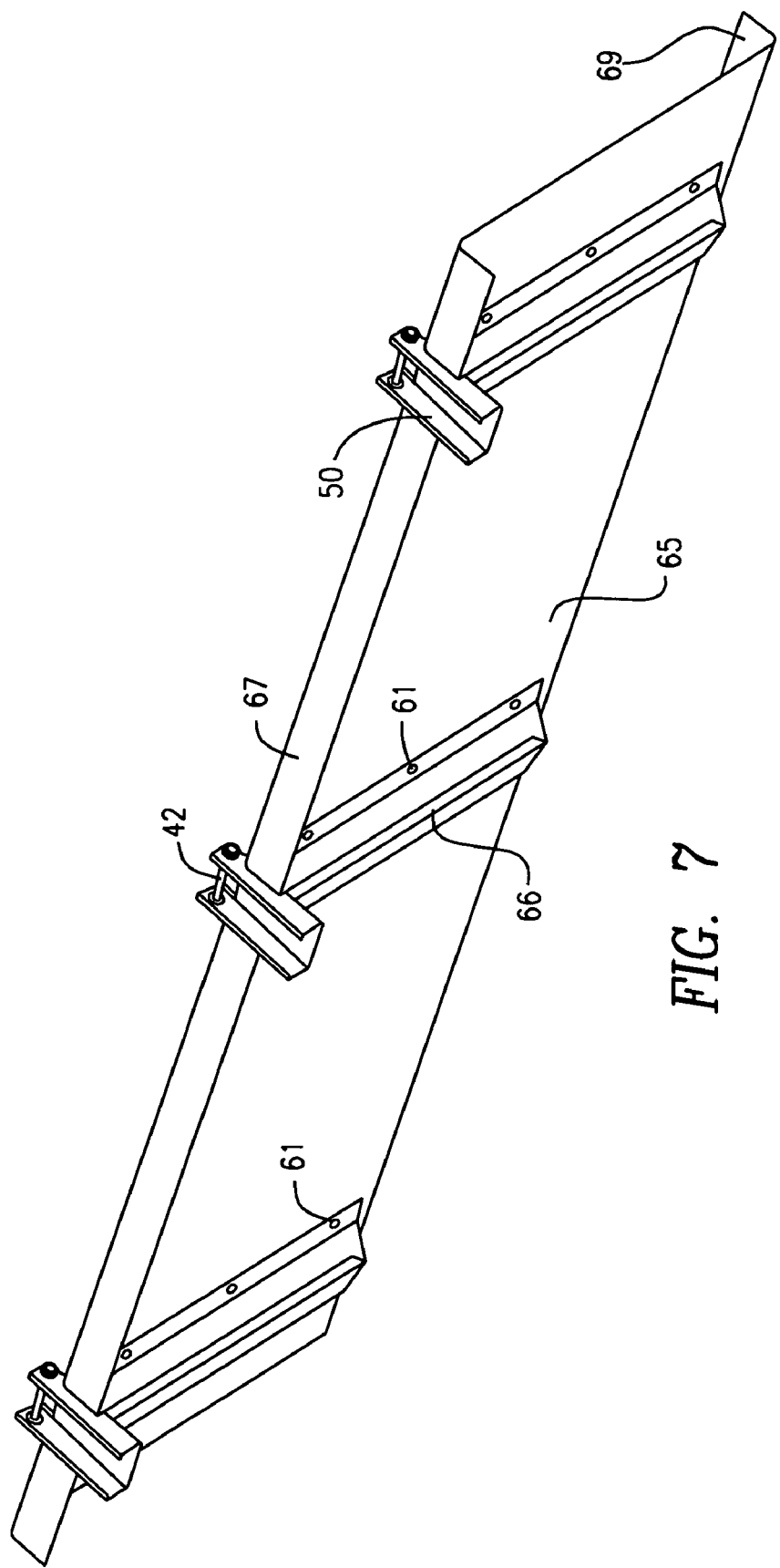
FIG. 7 is a perspective view take from the outboard and under side of a shelf section of FIG. 1.
Figure 13:
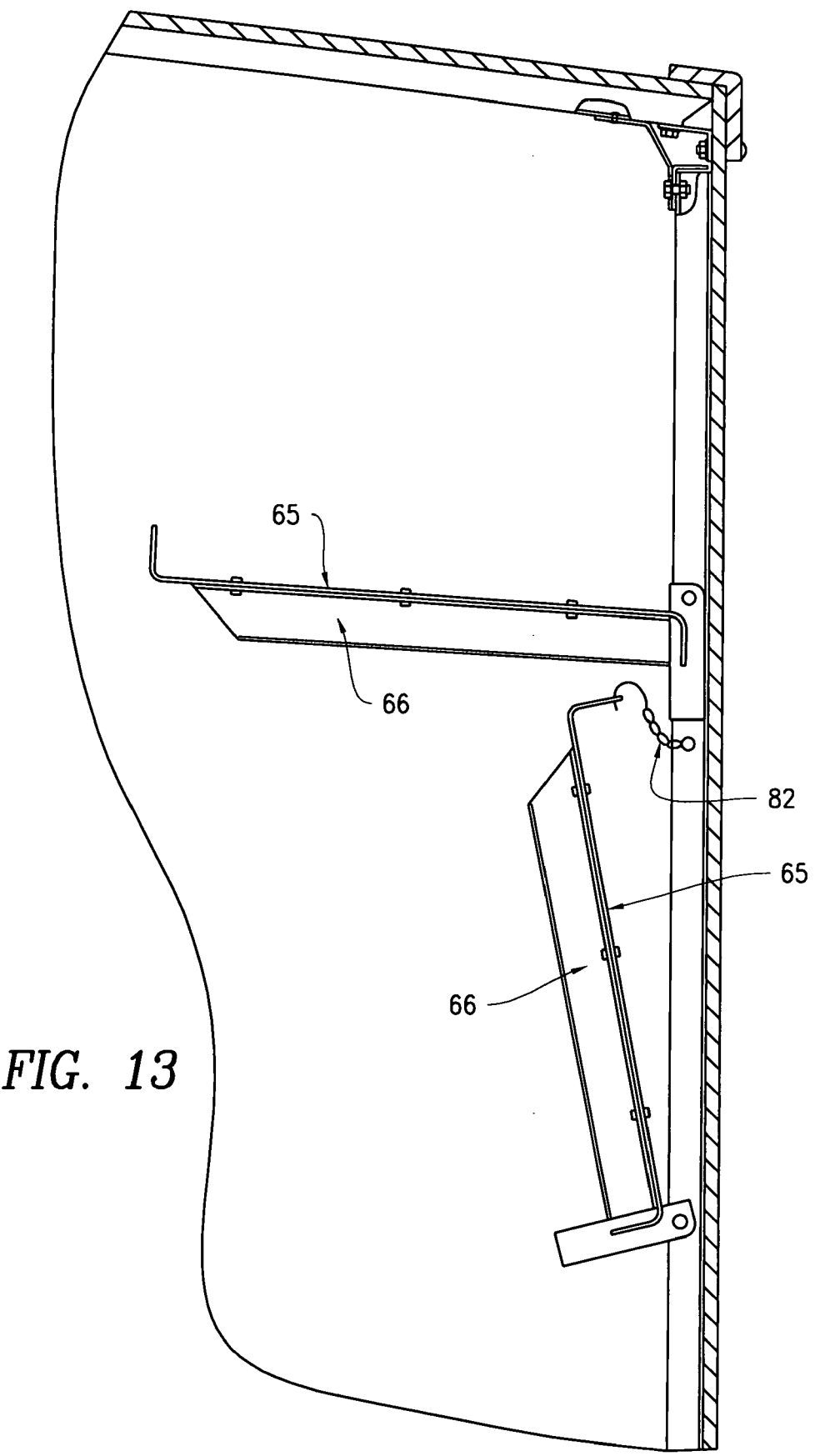
FIG. 13 is a side section view of the upper, outer portion of the cargo area.
Figure 14:
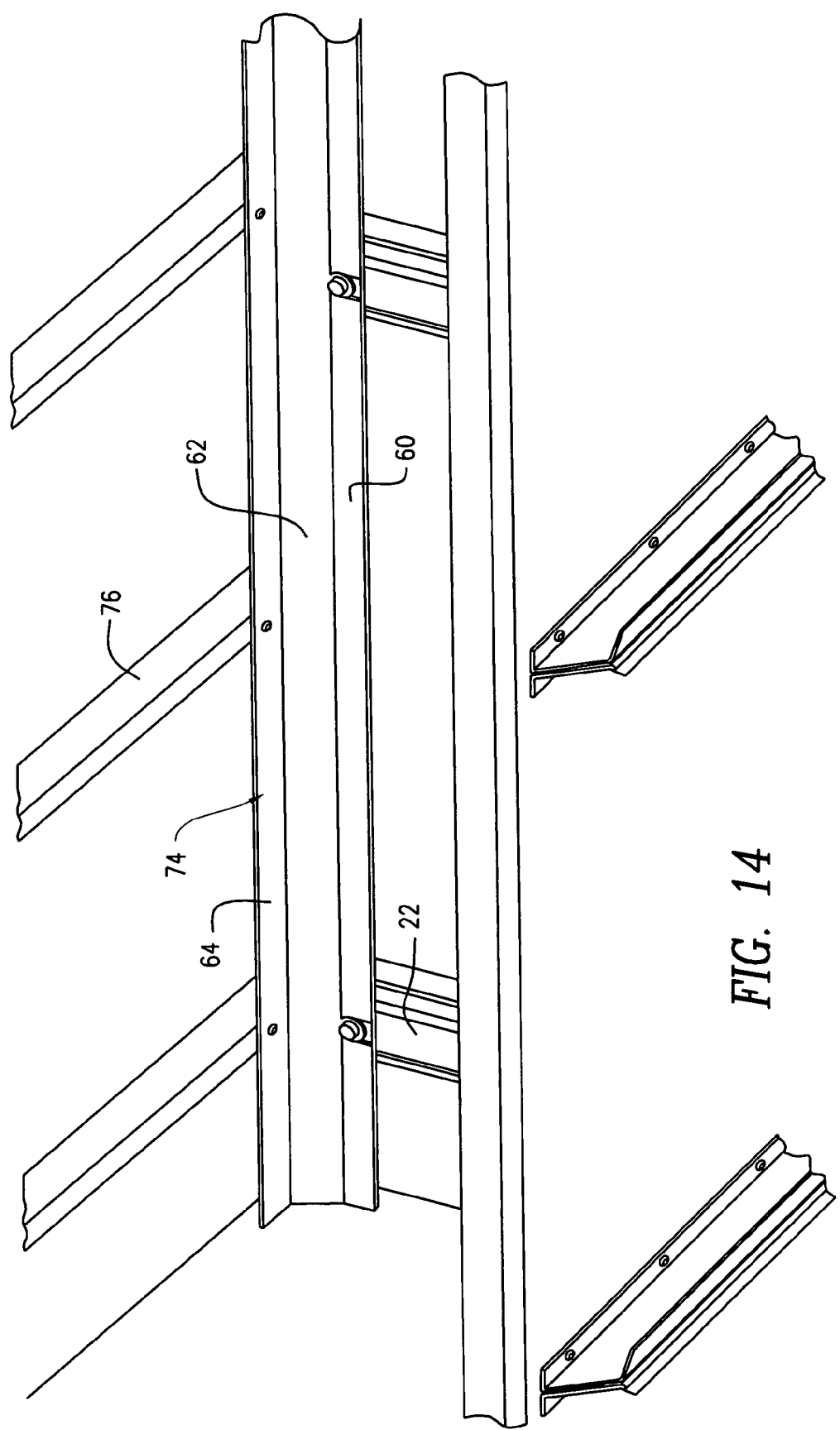
FIG. 14 is a perspective view taken upward and outward of FIG. 13.

Once the framing skeleton (i.e., upright members 22, crossbars 24 and 32, and possibly transverse struts 76 described below) is installed, shelf support arms or brackets 66 are mounted on the members 22. In one example, each center span 41 of member 22 includes a number of vertically spaced hole pairs 44 defined in the center span sidewalls (see, e.g., FIG. 2). The axes of the hole-pairs 44 are aligned to form multiple tiers of pivot points for the shelving sections. A shelf support arm 66, further described below, is rotatably mounted to an axle-like structure such as a bushing 45 and/or through bolt 46 mounted within each or selective ones of the hole pairs. As seen in FIGS. 1 and 7, a shelf section 65 with down turned outboard flange/edge 67 and upturned inboard flange/edge 69 is secured to, for example, three support arms or brackets 66 to enable each shelf section to rotate between the upward, stored position or downward or use position. The shelf section 65 can be riveted or spot-welded to the arms at 61. The upturned edge primarily functions to keep cargo from sliding off the shelf during transport or loading. Also, as shown in FIG. 13, shelf section 65 can include an opening in upturned edge 69, e.g., which receives a retaining pin or hook attached to chain 82, which is secured to an upright or any other type of suitable means.

Figure 9:
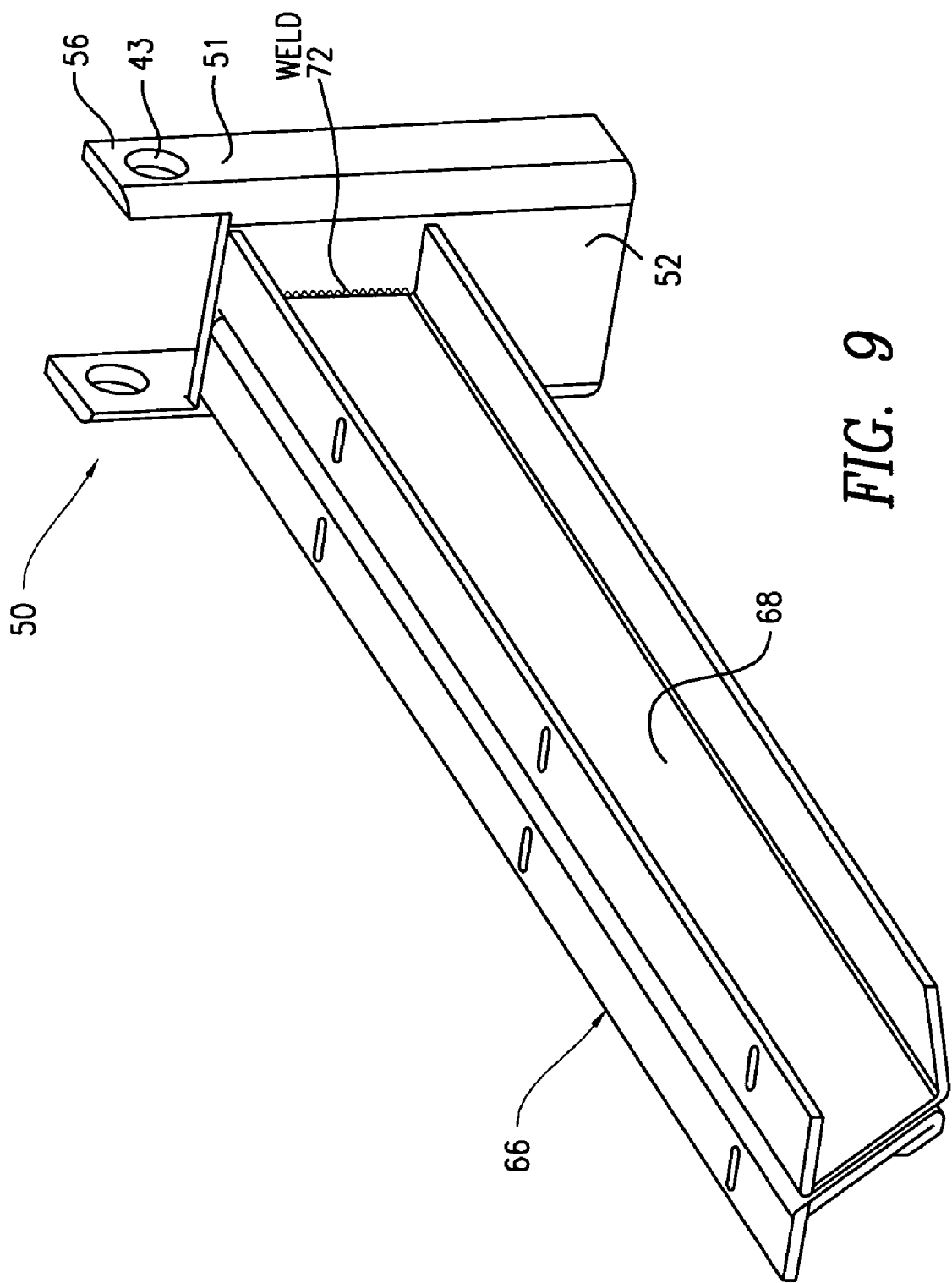
FIG. 9 is a perspective view looking outboard of a shelf bracket.
Figure 10:
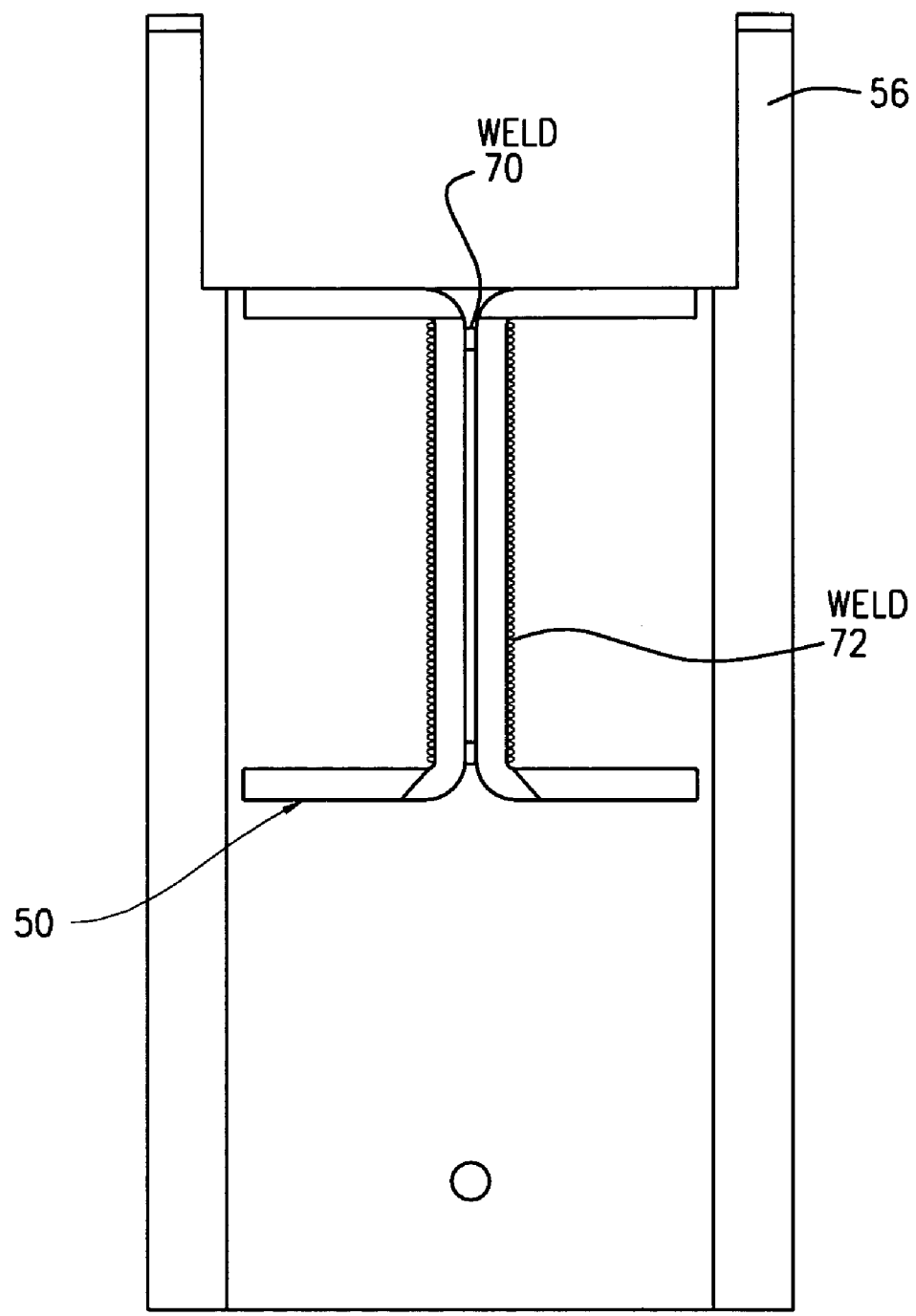
FIG. 10 is a front view of the bracket of FIG. 9.
Figure 11:
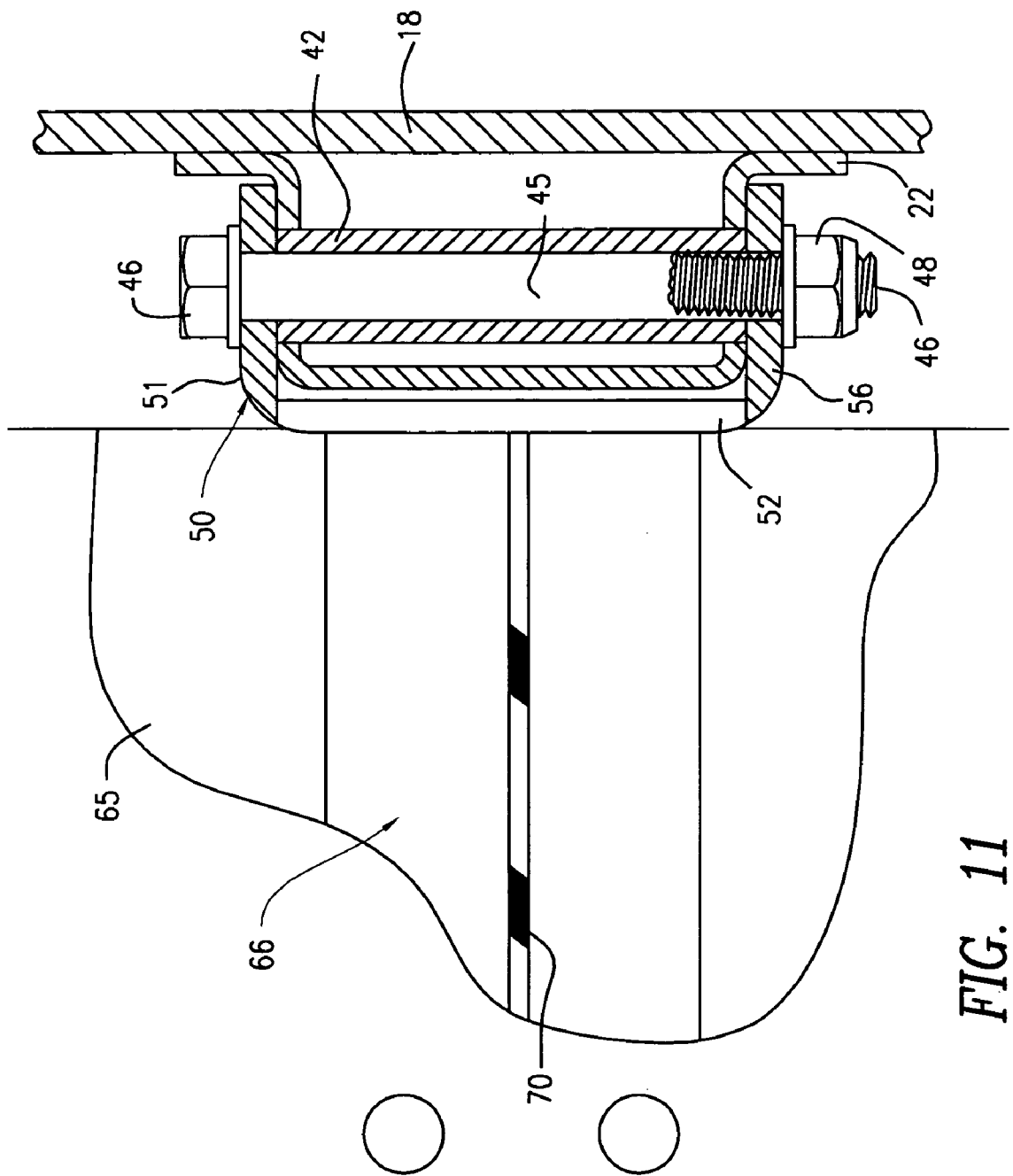
FIG. 11 is a cut-a-way top sectional view taken along FIG. 11-FIG. 11 of FIG. 12.
Figure 12:
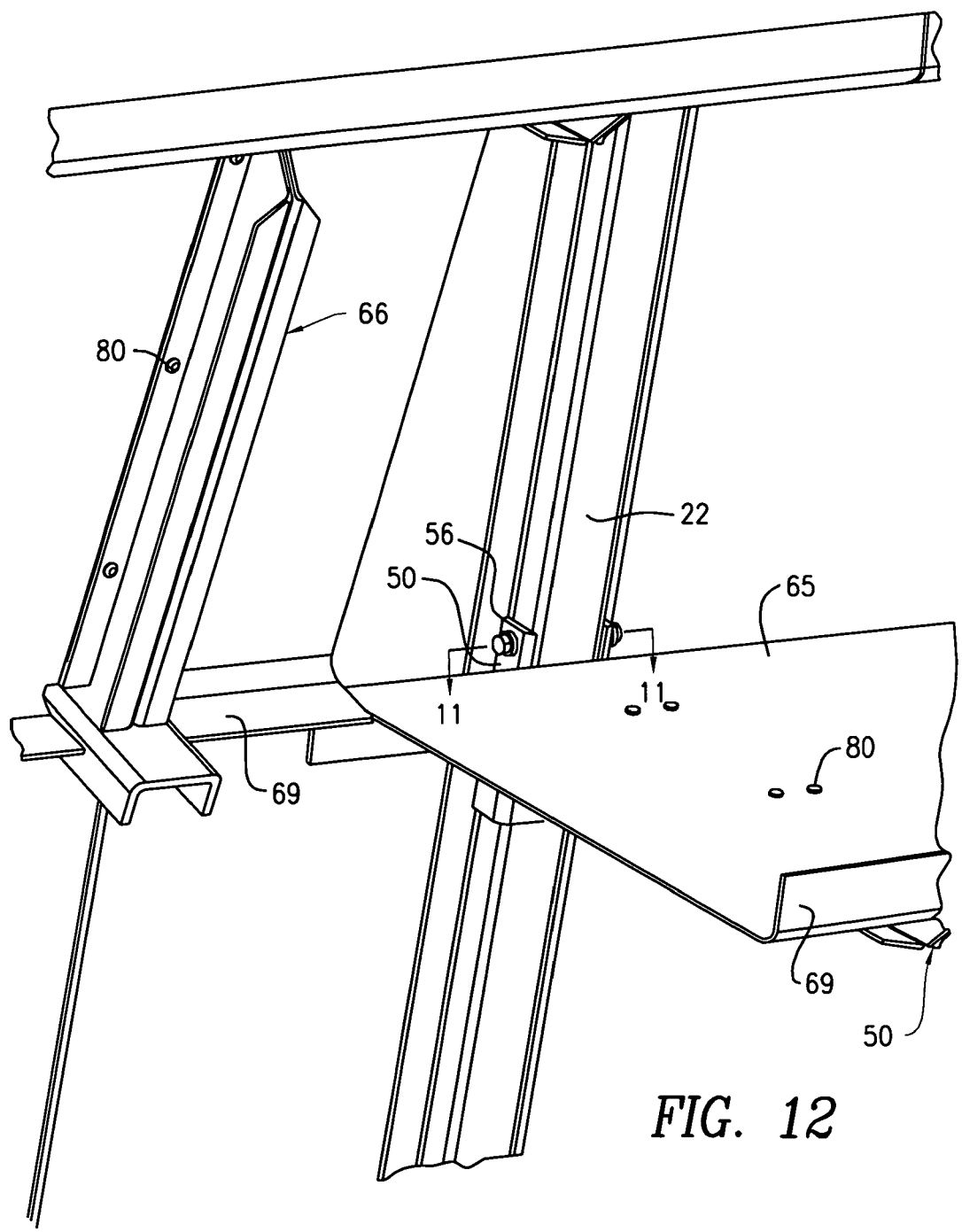
FIG. 12 is a perspective view looking outboard and cut-a-way of one shelf section in a use position and one in a stored position.

As shown in FIGS. 9 and 10, each support arm 66 can include a pair of back-to-back U-channels 68, secured e.g. by welds 70 at their top and bottom seams and cut back at their inboard ends to avoid sharp corners. Each of the outboard ends can be welded at welds 72 to the center span 52 of channel bracket 50. The sidewalls 51 of brackets 50 include longitudinal holes 43 for rotatably securing an axle-like structure including some or all of a through bolt 46, outer tube 42, and bushing 45 (see FIG. 11). For shelves that are frequently moved between their storage or in-use positions, bushing 45 would be preferred. For shelves that are not frequently to be rotated between positions, simply using through bolt 46 as the axle will suffice. Arm 66 rotates about through bolt 46, which bolt is secured by (preferably elastic) stop nut 48. Note the sidewall ears 56 of channel bracket 50 extend above the shelf section 65 so that the pivot axis is also above shelf section 65. As shown on the left side of FIG. 12, this arrangement assures that upward rotation of the self-section 65 will be substantially vertical when in the stored position. The down or in-use position, shown on the right side of FIG. 12, e.g., is secured when the mid-span 52 of channel bracket 50 engages center span 41 of upright member 22.

Figure 17:
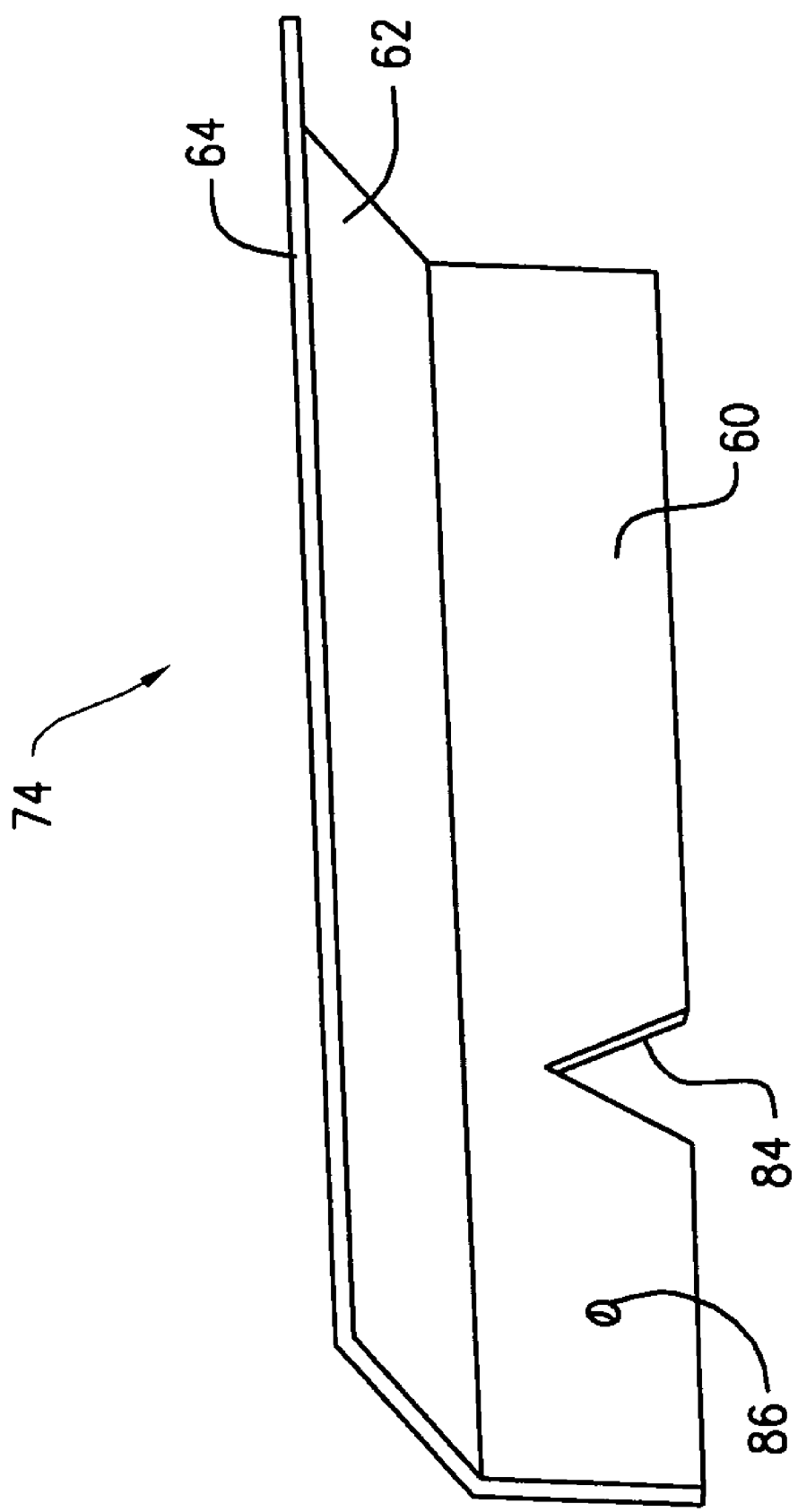
FIG. 17 is a perspective view of a suitable cornice bracket 74.
Figure 18:
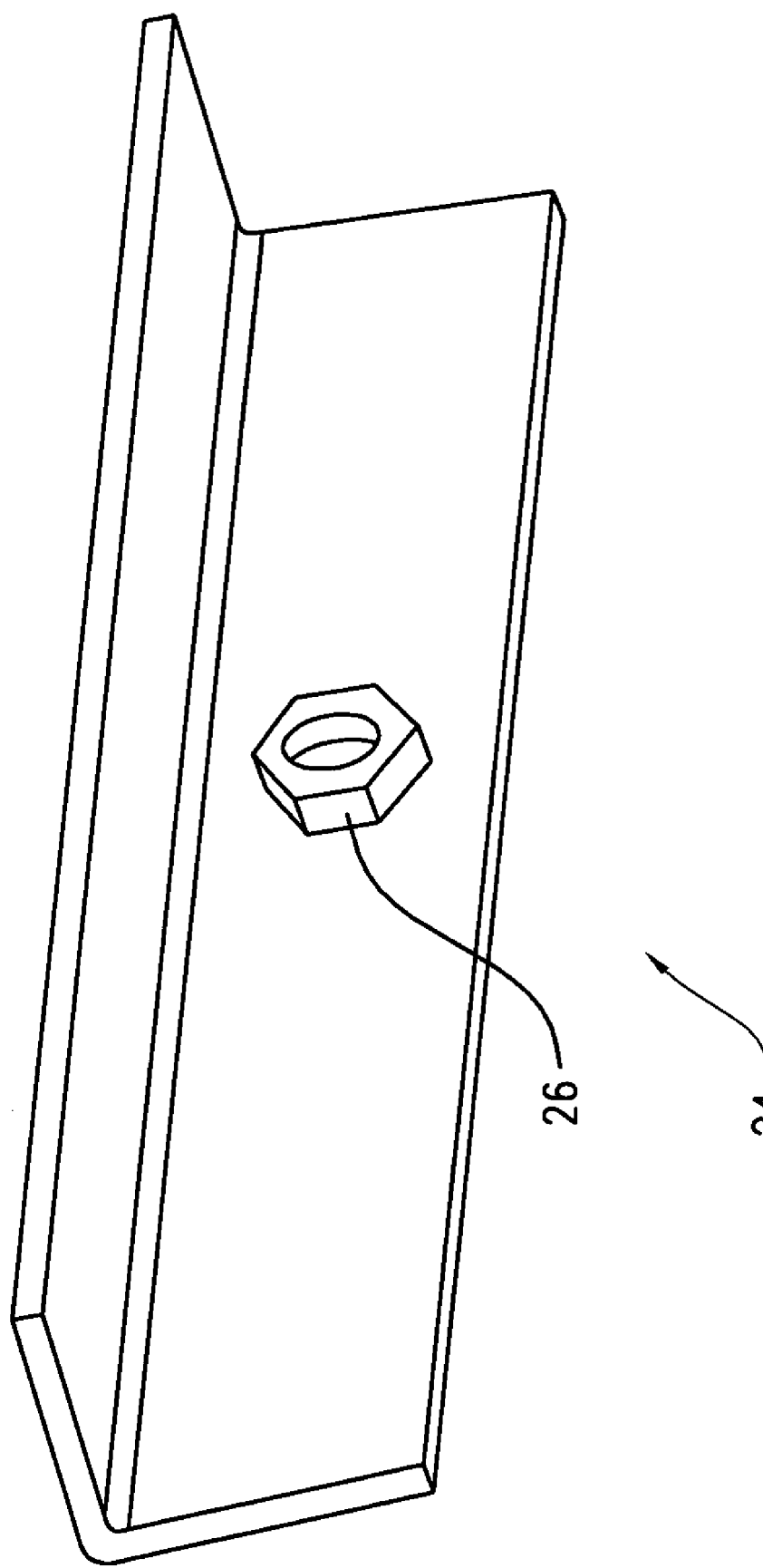
FIG. 18 is a perspective looking outboard of a suitable L-bar 24.

Preferably after uprights 22 are floor mounted, a cornice plate bracket 74 can be spot welded, riveted, or otherwise connected to top bar 24. As shown in FIG. 17 and in situ in FIGS. 6 and 14, cornice plate 74 includes a bottom plate 60, roof plate 64, and center plate 62. Roof plate 64 can be spot welded to the transverse metal struts, beams, or ribs 76 that conventionally exist on many of the subject trucks or that can be added and installed as part of the framing system 20 hereof. The bottom plate 60 can be welded or otherwise secured to and along the inboard side of the L-shaped top bar 24. Cutouts 84 can be provided to enable fitting of bolts 28 in to L-bar 24 without interference. Rivet holes 86 can also be provided as desired. It should be understood that the struts or ribs 76 extend over the cargo area and are connected by another cornice 76 to the top bar 24 of the opposing frame 20C or 20D in FIG. 6. Bar 24 includes weld nut 26 aligned with the opening in the depending leg of bar 24 to receive and secure bolt 28. This arrangement prevents any lateral or fore and aft movement of the tops of upright members 40. Struts 76 and uprights 22 can have any suitable cross section shape such as those shown in FIGS. 15 A-D and FIGS. 16 A-D.

Figure 21:
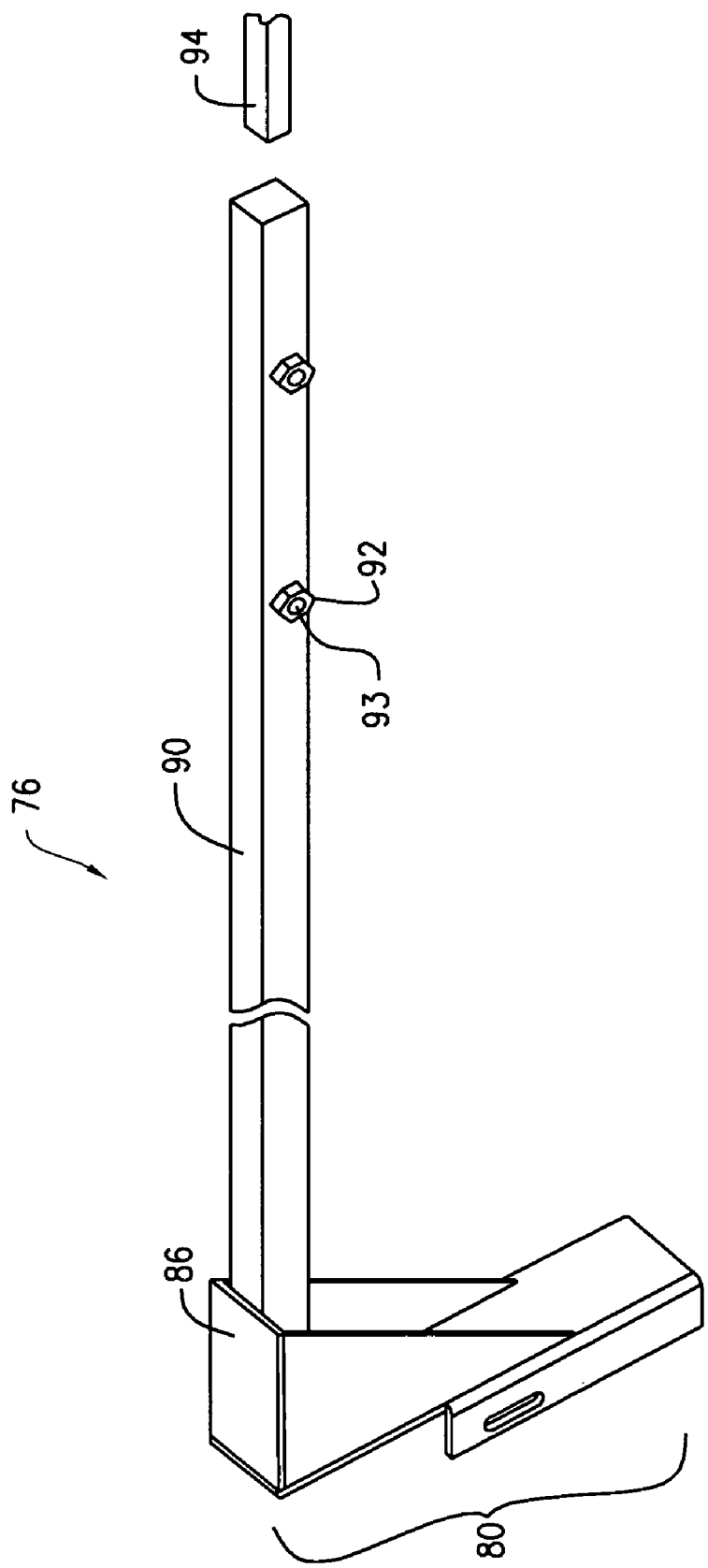
FIG. 21 is a perspective view of an adjustable transverse strut.

If transverse struts 76 are already integral with the roof of the truck, then the tops of upright members 40 may be connected thereto directly. If not, transverse struts may be provided as part of the inventive system. In order to accommodate trucks of differing widths, it is preferable that struts 76 be made adjustable in length. For example, as shown in FIG. 21, roof bracket 80 secures the upper end of upright support member 22 (not shown in FIG. 21) to transverse strut 76. Roof bracket 80 includes a channel section 82, which fits securely around the mid-span of upright support member 22. Triangular section 84 fits securely in the corner of the truck where the roof meets a sidewall; top plate 86 should rest against the roof, and side plates 84 provide support therefor. Attached to bracket 80 is outer tube 90, which includes lock nuts 92 and set screws 93. Inner tube 94 is slightly smaller in diameter than outer tube 90 and fits therein. The relative positions of inner and outer tubes 90 and 94 are fixable via application of set screws 93 and lock nuts 92.

Only one side of transverse strut 76 is shown in FIG. 21. The other side, i.e., the roof bracket 80 on the opposite sidewall of the truck, may be the mirror image of what is shown in FIG. 21. That is, the other end of inner tube 94 may telescope inside and be fixable to another outer tube 90 secured to the opposite roof bracket 80. In such a configuration, transverse strut 76 would include three elements: two outer tubes 90 and a central inner tube 94. In another embodiment, inner tube 94 may be directly secured to the opposite roof bracket 80, thereby eliminating the need for a third section of the transverse strut 76. Inner tube 94 need not be entirely made with a smaller diameter than outer tube(s) 90; for example, the ends of inner tube 94 may be made with the smaller diameter, yet a central portion may be the same size as outer tube 90. Similarly, outer tube 90 need not be uniform in diameter either, and may include smaller or larger sections. What is important is that the respective ends of outer and inner tubes 90 and 94 be telescopable and fixable in position.

The invention is not limited to the above description or the embodiments shown in the drawings but is rather defined by the claims appearing hereinbelow and any equivalents thereof. Modifications to the invention that are within the knowledge of one of ordinary skill in the art are considered to be within and incorporated by the scope of the invention.

What is claimed is:

1. A shelving system for a cargo area of a cargo vehicle, comprising:
    substantially vertical upright support members, each having a top end and a bottom end, said bottom ends secured to the floor of a cargo area of a vehicle, said upright support members being horizontally spaced apart and adjacent side walls of the cargo area but not secured to any of the walls of the area;
    shelves vertically adjustably attached to said upright members; and
    transverse support members substantially perpendicular to the side walls of the cargo area securing said top ends of opposing of said upright support members respectively adjacent opposite side walls.

2. A shelving system for a cargo area of a cargo vehicle according to claim 1, further comprising a first crossbar substantially parallel to a wall of the cargo area securing said top ends of said upright support members that are adjacent a common wall together.

3. A shelving system for a cargo area of a cargo vehicle according to claim 1, wherein said transverse support members comprise transverse ribs of the roof of the cargo vehicle.

4. A shelving system for a cargo area of a cargo vehicle according to claim 2, further comprising a second crossbar substantially parallel to said first crossbar and the adjacent wall of the cargo area securing said bottom ends of said upright support members that are adjacent a common wall together.

5. A shelving system for a cargo area of a cargo vehicle, comprising:
    substantially vertical upright support members, each having a top end and a bottom end, said bottom ends secured to the floor of a cargo area of a vehicle, said upright support members being horizontally spaced apart adjacent but not secured to side walls of the cargo area; and
    shelves vertically adjustably attached to said upright members,
    wherein said upright support members are adjustable in height.

6. A shelving system for a cargo area of a cargo vehicle according to claim 5, said bottom ends further comprising telescoping feet adjustable to accommodate variations in the height of the floor of the cargo vehicle.

7. A shelving system for a cargo area of a cargo vehicle, comprising:
    substantially vertical upright support members, each having a top end and a bottom end, said bottom ends secured to the floor of a cargo area of a vehicle, said upright support members being horizontally spaced apart adjacent but not secured to side walls of the cargo area;
    shelves vertically adjustably attached to said upright members; and
    shims insertable between said bottom ends and the floor of the cargo vehicle to accommodate variations in the height of the floor.

8. A shelving system for a cargo area of a cargo vehicle, comprising:
    substantially vertical upright support members, each having a top end and a bottom end, said bottom ends secured to the floor of a cargo area of a vehicle, said upright support members being horizontally spaced apart adjacent but not secured to side walls of the cargo area; and
    shelves vertically adjustably attached to said upright members, said shelves being pivotable between a first in-use position substantially parallel to the floor of the cargo vehicle and a second storage position substantially parallel to the walls of the cargo vehicle.

9. A shelving system for a cargo area of a cargo vehicle, comprising:
    substantially vertical upright support members, each having a top end and a bottom end, said bottom ends secured to the floor of a cargo area of a vehicle, said upright support members being horizontally spaced apart adjacent but not secured to side walls of the cargo area; and
    shelves vertically adjustably attached to said upright members,
    wherein each of said upright support members has a central longitudinal channel.

10. A shelving system for a cargo area of a cargo vehicle according to claim 9, further comprising channel brackets pivotably securable to said channels of said upright support members, wherein said shelves are attached to said channel brackets.

11. A shelving system for a cargo area of a cargo vehicle according to claim 10, further comprising:
first holes formed in said channels;
second holes formed in said channel brackets; and
an axle disposed in said first and second holes securing said channel brackets to said channels,
wherein said channel brackets rotate about said axles.

12. A shelving system for a cargo area of a cargo vehicle according to claim 1, wherein said transverse support members are adjustable in length.

13. A shelving system for a cargo area of a cargo vehicle according to claim 12, each said transverse support member further comprising a first transverse element and a second transverse element, at least a portion of said second transverse element being of smaller diameter than at least a portion of said first transverse element, said portion of said second transverse element being telescopable within and fixable to said portion of said first transverse element to thereby adjust the length of said transverse support member.

14. A shelving system for a cargo area of a cargo vehicle according to claim 2, wherein said upright support members and said first crossbar are assembleable as a modular frame section outside the cargo area of a cargo vehicle for post-assemble installation within the cargo area.

15. A shelving system for a cargo area of a cargo vehicle according to claim 4, wherein said upright support members and said first and second crossbars are assembleable as a modular frame section outside the cargo area of a cargo vehicle for post-assembly installation within the cargo area.

16. A shelving system for a cargo area of a cargo vehicle according to claim 4, wherein said upright support members, said first and second crossbars, and said transverse support members are assembleable as a modular frame section outside the cargo area of a cargo vehicle for post-assembly installation within the cargo area.

17. A shelving system for a cargo area of a cargo vehicle according to claim 11, said first holes comprising multiple sets of holes vertically disposed along said channel, wherein shelf height can be vertically adjusted by selecting which of said sets of holes in said channel to secure said axle and said channel bracket.

18. A shelving system for a cargo area of a cargo vehicle according to claim 17, wherein each shelf is independently adjustable.

19. A shelving system for a cargo area of a cargo vehicle according to claim 1, wherein said upright support members are aligned with the side walls of the cargo area.

20. A shelving system for a cargo area of a cargo vehicle according to claim 11, wherein said channel bracket further comprises a pair of opposed cars fittable on either side of said channel of said upright support member.

21. A shelving system for a cargo area of a cargo vehicle according to claim 20, wherein said channel brackets pivot around said axle between a first, substantially vertical storage position and a second substantially horizontal in-use position.

22. A shelving system for a cargo area of a cargo vehicle according to claim 21, wherein said channel brackets abut respective inboard faces of said channels of said upright support members.

* * * * *